US009511761B2

(12) United States Patent
Yagyu et al.

(10) Patent No.: US 9,511,761 B2
(45) Date of Patent: Dec. 6, 2016

(54) HYBRID VEHICLE

(71) Applicant: Kubota Corporation, Osaka-shi (JP)

(72) Inventors: Sumio Yagyu, Sakai (JP); Go Takaki, Sakai (JP); Shinichi Kawabata, Sakai (JP); Shigeki Hayashi, Sakai (JP); Shohei Nakai, Sakai (JP); Hiroki Bessho, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 14/024,406

(22) Filed: Sep. 11, 2013

(65) Prior Publication Data

US 2014/0113766 A1  Apr. 24, 2014

(30) Foreign Application Priority Data

Oct. 19, 2012 (JP) ................................ 2012-231869
Jan. 10, 2013 (JP) ................................ 2013-002885
Jun. 17, 2013 (JP) ................................ 2013-126687

(51) Int. Cl.
*F16H 9/12* (2006.01)
*B60W 20/00* (2016.01)
(Continued)

(52) U.S. Cl.
CPC ............. *B60W 20/30* (2013.01); *B60K 6/387* (2013.01); *B60K 6/405* (2013.01); *B60K 6/48* (2013.01); *B60K 6/52* (2013.01); *B60K 6/543* (2013.01); *B60W 10/02* (2013.01); *B60W 10/06* (2013.01); *B60W 10/08* (2013.01); *F16H 9/125* (2013.01); *B60K 6/383* (2013.01);
(Continued)

(58) Field of Classification Search
CPC .......... B60W 20/00; B60W 20/30; F16H 9/12; F16H 9/125; F16H 9/18
See application file for complete search history.

(56) References Cited

U.S. PATENT DOCUMENTS 5,704,440 A * 1/1998 Urban et al. ............... 180/65.23
5,928,301 A * 7/1999 Soga et al. ...................... 701/51
(Continued)

FOREIGN PATENT DOCUMENTS

JP  2003080956 A  3/2003
JP  2003307270 A  10/2003
(Continued)

*Primary Examiner* — Ramya Burgess
*Assistant Examiner* — David Morris
(74) *Attorney, Agent, or Firm* — The Webb Law Firm

(57) ABSTRACT

A hybrid vehicle includes an engine, a motor, and a belt stepless speed changer device having a driving rotary body, a driven rotary body, a first shaft member supporting the driving rotary body with allowing rotation thereof in unison, a second shaft member supporting the driven rotary body with allowing rotation thereof in unison, and an endless belt wound around the driving rotary body and the driven rotary body. The vehicle further includes a transmission case configured to receive the powers from the engine and the motor via the belt stepless speed changer device and a centrifugal clutch incorporated in a power transmission line extending form the engine to the first shaft member. The motor is disposed on the side opposite the engine across the driving rotary body, and the driving power of the motor is inputted to the first shaft member.

6 Claims, 11 Drawing Sheets

(51) Int. Cl.
*B60K 6/387* (2007.10)
*B60K 6/405* (2007.10)
*B60K 6/48* (2007.10)
*B60K 6/52* (2007.10)
*B60K 6/543* (2007.10)
*B60W 10/02* (2006.01)
*B60W 10/06* (2006.01)
*B60W 10/08* (2006.01)
*F16H 9/18* (2006.01)
*B60K 6/383* (2007.10)

(52) U.S. Cl.
CPC .............. *B60K 2006/4816* (2013.01); *B60W 2510/0638* (2013.01); *F16H 9/18* (2013.01); *Y02T 10/6221* (2013.01); *Y02T 10/6256* (2013.01); *Y02T 10/6265* (2013.01); *Y02T 10/6286* (2013.01); *Y10S 903/902* (2013.01); *Y10T 477/26* (2015.01)

(56) References Cited

U.S. PATENT DOCUMENTS

| | | | |
|---|---|---|---|
| 6,116,363 A * | 9/2000 | Frank | 180/65.25 |
| 6,175,785 B1 * | 1/2001 | Fujisawa et al. | 701/22 |
| 6,253,865 B1 * | 7/2001 | Suzuki | 180/65.25 |
| 6,269,895 B1 * | 8/2001 | Tanuguchi et al. | 180/65.25 |
| 7,462,964 B2 * | 12/2008 | Nagayama et al. | 310/58 |
| 2003/0066696 A1 * | 4/2003 | Nakamura | 180/68.1 |
| 2004/0055851 A1 * | 3/2004 | Ishizaka et al. | 192/105 CD |
| 2008/0076616 A1 * | 3/2008 | Kidokoro et al. | 475/5 |

FOREIGN PATENT DOCUMENTS

| | | |
|---|---|---|
| JP | 2008126702 A | 6/2008 |
| JP | 2010261544 A | 11/2010 |
| JP | 2011132937 A | 7/2011 |

* cited by examiner

Fig.11 table of operation states of driving apparatus

| | | engine<br>O rotation × stop | electromagnetic clutch<br>O ON × OFF | centrifugal clutch<br>O ON × OFF | motor<br>O operation × stop | generator<br>O operation × stop | CVT<br>torque transmission direction |
|---|---|---|---|---|---|---|---|
| vehicle stop | | × | × | × | × | × | × |
| start | E | cranking | O | × | O | × | forward |
| | EV | × | × | × | O | × | forward |
| travel | E | O | × | O | × | ×(O) | forward |
| | EV | × | × | × | O | × | forward |
| | HEV | O | × | O | O | × | forward |
| speed reduction | regeneration(1) | idling | × | × | × | O | reverse |
| | regeneration(2) | × | × | × | × | O | reverse |
| sudden braking | regenerative braking | × | × | × | × | O | reverse |
| | engine braking | engine braking | O | × | × | O | reverse |
| battery full charge | travel(EV) | × | × | × | O | × | forward |
| | travel(HEV) | O | × | O | O | × | forward |
| | speed reduction/sudden braking | engine braking | O | × | × | × | reverse |

HYBRID VEHICLE

CROSS-REFERENCE TO RELATED APPLICATION

This application claims priority to Japanese Patent Application Nos. 2012-231869 filed Oct. 19, 2012, 2013-002885 filed Jan. 10, 2013, and 2013-126687 filed Jun. 17, 2013, the disclosures of which are hereby incorporated in their entirety by reference.

BACKGROUND OF THE INVENTION

1. Field of the Invention

The present invention relates to a hybrid vehicle having an engine and a motor.

2. Description of the Related Art

For vehicles such as automobiles, for the purpose of seeking improvement in fuel consumption economy and reduction of exhaust gas amount, there is proposed a hybrid vehicle having a motor for providing auxiliary power, in addition to a gasoline engine.

Japanese Unexamined Patent Application Publication No. 2003-080956 discloses an engine unit for a starter, having an engine, a motor, a belt stepless speed changer, etc. In this engine unit, a drive pulley is mounted on a crank shaft of the engine and a length of belt is wound around this drive pulley and a driven pulley. The driven pulley is operably coupled to a drive shaft of a speed reducing drive mechanism via a centrifugal clutch. Further, the motor is mounted between the outer circumference of a clutch outer member as a driven side member of the centrifugal clutch and the inner circumference of a centrifugal clutch accommodating section (see e.g. FIG. 3). With the above-described arrangement in operation, the driving power of the engine is transmitted to the rear wheels via the belt stepless speed changer and the drive shaft of the speed reducing drive mechanism, etc. When the traveling load of the vehicle is large, the motor is also driven in addition to the above and the driving power of the motor is transmitted to the rear wheels. And, the regenerative energy generated at the time of speed reduction and braking is collected via the motor.

Further, Japanese Unexamined Patent Application Publication No. 2010-261544 and Japanese Unexamined Patent Application Publication No. 2003-307270 disclose hybrid systems that can be mounted in a work machine capable of traveling, such as a tractor, a backhoe, a multi-purpose work vehicle, a riding automobile, etc. and that are configured to transmit the driving powers of an engine and a motor generator to a belt stepless speed changer mechanism (CVT).

In the hybrid system disclosed in Japanese Unexamined Patent Application Publication No. 2010-261544, the crank shaft of the engine is connected to an input member of a multiple-disc clutch and an output member of this clutch is connected to the drive shaft of the belt stepless speed changer mechanism; and there is provided an electric generator having a rotor rotatable therewith on the outer circumference side of the clutch housing of the clutch. This hybrid system has a normal mode in which driving is provided by the engine, an assist mode in which the driving is provided by the engine and the electric generator, an EV mode in which the driving is provided by the electric generator, and a regenerative mode in which the electric generator is braked for regeneration.

In the hybrid system disclosed in Japanese Unexamined Patent Application Publication No. 2003-307270, the crank shaft of the engine is connected to an input member of a multiple-disc clutch and an output member of this clutch is connected to one end of a drive shaft of the belt stepless speed changer mechanism and the other end of the drive shaft is connected to the electric generator.

Further, conventionally, in a driving apparatus mounted in a traveling vehicle such as a tractor, a backhoe, a multi-purpose work vehicle, a riding automobile, etc., as disclosed in Japanese Unexamined Patent Application Publication No. 2011-132937, a propelling shaft (crank shaft) of the engine is connected to an input member of a centrifugal clutch and an output member of the centrifugal clutch is connected to a drive shaft of a belt stepless speed changer mechanism (CVT) so as to transmit a traveling driving power thereto.

And, an example of hybrid system capable of driving a driving apparatus mounting such belt stepless speed changer mechanism by a motor generator also, is disclosed by Japanese Unexamined Patent Application Publication No. 2010-261544.

According to the technique of Japanese Unexamined Patent Application Publication No. 2010-261544, a propelling shaft (crank shaft) of the engine is connected to an input member of a multiple-disc clutch via a damper and an output member of this clutch is connected to a drive shaft of a belt stepless speed changer mechanism. And, there is provided an electric generator (motor generator) having a rotor rotatable therewith on the outer circumference side of the clutch housing of the clutch. This hybrid system has a normal mode in which driving is provided by the engine, an assist mode in which the driving is provided by the engine and the electric generator, an EV mode in which the driving is provided by the electric generator, and a regenerative mode in which the electric generator is braked for regeneration (see second embodiment).

Further, an example of a driving apparatus for a traveling vehicle having two kinds of clutches mounted between an engine and a speed changer that can be set to a non-transmitting state is disclosed in Patent Document 3.

According to the technique disclosed in this Japanese Unexamined Patent Application Publication No. 2008-126702, a driving apparatus for a traveling vehicle includes an engine, a speed changer that can be set to a non-transmitting state, and a drive unit mounted between the engine and the speed changer and having a motor (power generator), and the power of at least one of the engine and the motor is transmitted to wheels via the speed changer and an output member of this speed changer, wherein the drive unit includes an input shaft connected to the engine, an output shaft connected to the speed changer, a coast clutch configured to disconnectably connect the input shaft and the output shaft and connected to the motor, a one-way clutch mounted parallel with the coast clutch and configured to transmit the rotation of the input shaft to the output shaft, but not to transmit the rotation of the output shaft to the input shaft, and a hydraulic pump driven by the output shaft for controlling engagement/disengagement of the coast clutch. The coast clutch is rendered into a locked state at the time of occurrence of no hydraulic pressure generation in the hydraulic pump (see claim).

And, according to the technique of this Japanese Unexamined Patent Application No. 2008-126702, the technique allows vehicle traveling by the engine alone or by the motor alone, or by the engine and the motor. The technique allows start and traveling by the motor alone, electric power charging at the time of start of the engine by the motor and start of the engine during traveling by the motor and speed reducing operation, charging during engine driving and speed reducing, as well as an engine braking operation during speed reduction, etc.

SUMMARY OF THE INVENTION

In the technique disclosed in Japanese Unexamined Patent Application Publication No. 2003-080956, since the motor is mounted between the outer circumference of the clutch outer which is a driven side member of the centrifugal clutch and the inner circumference of the centrifugal clutch accommodating section, there is the problem of the diameter of this portion being enlarged.

Incidentally, with such hybrid vehicle described above, there is sometimes a desire for easy mounting of the motor without need for significant change in the conventional specification of the vehicle which is driven by the engine.

In the case of the technique of Japanese Unexamined Patent Application Publication No. 2010-261544, in order to render the hybrid function ON by operating the electric generator, it is required to render the clutch ON by a manual controller or an electric controller. Moreover, in the case of the EV mode in which the driving is provided by the electric generator and the regenerative mode in which the electric generator is braked for regeneration, the clutch is engaged (ON), so that the crank shaft of the engine is also rotated. Hence, it is difficult to provide the EV mode or the regenerative mode without involving rotation of the crank shaft.

Further, in the case of the technique of Japanese Unexamined Patent Application Publication No. 2003-307270, in the case of the disengaged state of the clutch also, the output shaft of the electric generator can be driven by being directly connected to the drive shaft of the stepless speed changer mechanism or via a gear transmitting means. However, the electric generator needs to be mounted by securing a space along the axial outer or radially outer direction of the drive shaft of the stepless speed changer mechanism. Hence, the apparatus is formed large.

In view of the above, there sometimes arises a need for a hybrid system that allows the hybrid function by a motor generator, even when the crank shaft of the engine is stopped or rotated at a low speed and irrespectively of a disengaged state of the clutch and that also can be formed compact between the clutch and the stepless speed changer mechanism.

In the case of the technique of Japanese Unexamined Patent Application Publication No. 2010-261544, a multiple-disc clutch is employed as the clutch for engine driving and the electric generator is disposed on the outer circumferential side of the clutch. Accordingly, the clutch and the electric generator are large-sized and it is not made possible to effect cranking of the engine by the electric generator or apply the engine braking during stop of the electric generator or from the regenerative mode.

In the case of the technique of Japanese Unexamined Patent Application Publication No. 2008-126702, the motor is arranged on the radially outer side of the hydraulic coast clutch. So, the motor is large and high precision control is required for the hydraulic coast clutch, thus inviting cost increase.

In view of the above, there is a need for a hybrid system having an engine and a motor generator and having also a centrifugal clutch, yet allowing cranking operation of the engine and engine braking operation.

A hybrid vehicle, according to the present invention, comprises:
an engine;
a motor;
a belt stepless speed changer device having a driving rotary body, a driven rotary body, a first shaft member supporting the driving rotary body with allowing rotation thereof in unison, a second shaft member supporting the driven rotary body with allowing rotation thereof in unison, and an endless belt wound around the driving rotary body and the driven rotary body;
a transmission case configured to receive the powers from the engine and the motor via the belt stepless speed changer device; and
a centrifugal clutch incorporated in a power transmission line extending form the engine to the first shaft member;
wherein the motor is disposed on the side opposite the engine across the driving rotary body, and the driving power of the motor is inputted to the first shaft member.

With the above-described arrangement, on one side across the belt stepless speed changer device, the engine is disposed and on the side opposite it, the motor is disposed. And, for the belt stepless speed changer device, the driving power of the engine is inputted to one side thereof, and the driving power of the motor is inputted to the other side thereof. Generally, some spare space is often present on the side of the belt stepless speed changer device opposite the engine, where the motor can be disposed easily.

Further, with the above-described arrangement, the power of the motor is inputted to the first shaft member. Therefore, regarding the driving power from the motor too, like the driving power from the engine, this power can be transmitted as a speed changed power through the belt stepless speed changer device to the transmission case.

According to one preferred embodiment of the present invention, a drive shaft of the motor is disposed coaxially with the first shaft member, so that the drive shaft and the first shaft member are rotated in unison. That is, according to this embodiment, there is no need to provide separately a power transmission mechanism or the like for power transmission from the motor to the belt stepless speed changer device. So, the configuration can be formed simple.

According to another preferred embodiment of the present invention, the hybrid vehicle further comprises a support bracket for rotatably supporting an end of the first shaft member on the side of the motor, and the motor is mounted to the support bracket. Namely, according to this embodiment, the motor can be mounted in a reliable manner with utilization of the support bracket for the first shaft member.

According to still another preferred embodiment of the present invention, the hybrid vehicle further comprises a case member for accommodating the belt stepless speed changer device, and the motor is mounted inside the case member. Namely, to the inside of the case member, cooling air current may sometimes be introduced for cooling the belt stepless speed changer device. In such case, as the motor is disposed inside the case member, the motor can be cooled with effective utilization of this cooling air current.

According to the present invention, a hybrid vehicle comprises:
an engine having an output shaft;
a one-way automatic power transmission clutch having an input member and an output member;
a stepless speed changer mechanism having a driving shaft and a driving member; and
a motor generator having a rotor;

wherein the output shaft is connected to the input member, the output member is connected to the driving shaft, and the rotor is connected and mounted on the driving shaft between the driving member and the output member.

With the above-described arrangement, even when the output shaft of the engine is stopped or rotated at a low speed, irrespectively of a disengaged state of the clutch, it is still possible to provide the hybrid function by the motor generator and the arrangement between the clutch and the stepless speed changer mechanism can be formed compact.

That is, since the rotor of the motor generator is connected and mounted on the driving shaft between the driving member of the stepless speed changer mechanism and the output member of the clutch, even when the output shaft of the engine is stopped or rotated at a low speed, the motor generator can assume the driving mode as well as the regenerative mode,. Moreover, the motor generator can be disposed in a compact manner along the axial direction as well as the radially outer direction of the driving shaft.

According to a still further preferred embodiment of the present invention, the output member and the driving shaft are connected coaxially and together; the rotor is fixedly engaged to the driving shaft; and a stator of the motor generator is fixed to a clutch casing of the clutch and to a speed changer case of the stepless speed changer mechanism.

That is, as the rotor is fixedly engaged with the driving shaft and the stator is fixed to the clutch casing and the speed changer case, the motor generator can be disposed in a compact manner between the clutch and the stepless speed changer mechanism.

According to a still further preferred embodiment of the present invention, the stepless speed changer mechanism comprises a belt stepless speed changer mechanism; and the clutch comprises a centrifugal clutch or a one-way clutch.

That is, while the driving power of the engine is automatically to the belt stepless speed changer mechanism via the centrifugal clutch or the one-way clutch, the driving power or the braking power of the motor generator can be transmitted to the belt stepless speed changer mechanism.

According to a still further preferred embodiment of the present invention, the hybrid vehicle further comprises a controller, the controller causing the motor generator to motor-drive the rotor when the engine is stopped or is rotated at a low rotation speed or a high rotation speed.

That is, when the engine is stopped or is rotated at a low rotation speed or a high rotation speed, the motor generator can be caused to provide the motor function.

According to a still further preferred embodiment of the present invention, the hybrid vehicle further comprises a controller, the controller causing the motor generator to generator-drive the rotor by the power from the engine when the engine is rotated at a high rotation speed.

That is, when the engine is rotated at a high rotation speed, the motor generator can be caused to provide the generator function for generating electric power.

According to a still further preferred embodiment of the present invention, the hybrid vehicle further comprises a controller, the controller causing the motor generator to generator-drive the rotor by the power from the stepless speed changer mechanism when there occurs a drop in the rotation speed of the engine.

That is, when there occurs a drop in the rotation speed of the engine, the motor generator can be caused to provide the generator function for energy regeneration and braking.

BRIEF DESCRIPTION OF THE DRAWINGS

FIG. 11 is a table of working states of a driving device.

DETAILED DESCRIPTION OF THE PREFERRED EMBODIMENTS

[First Embodiment]

Next, an embodiment of the present invention will be described with reference to the accompanying drawings. Here, there will be described an exemplary case in which this hybrid system is applied to a utility vehicle as an example of a work vehicle, which in turn is an example of a hybrid vehicle.

Figure 1:
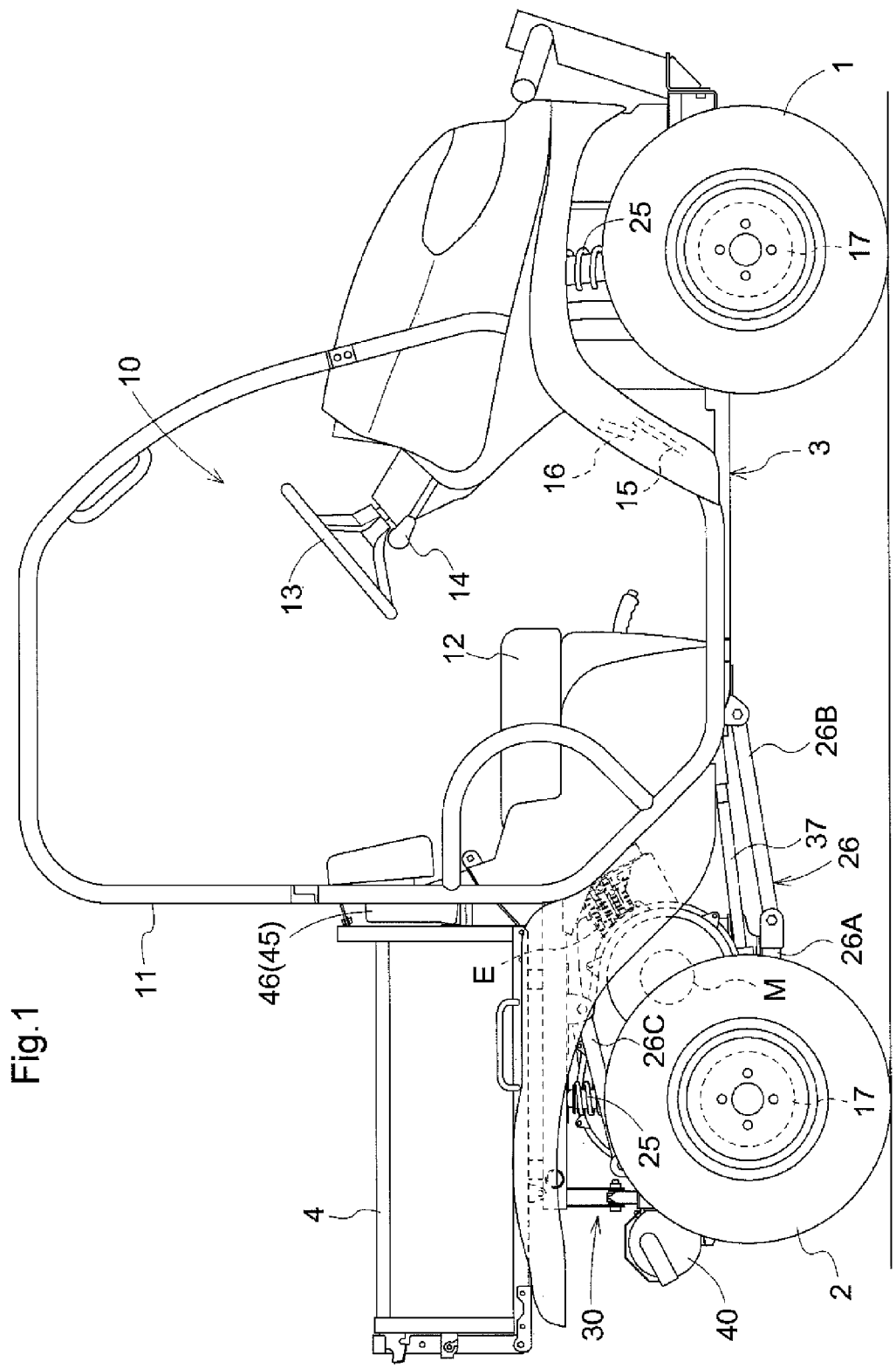
FIG. 1 is a side view showing a utility vehicle as an example of a hybrid vehicle according to a first embodiment.
Figure 2:
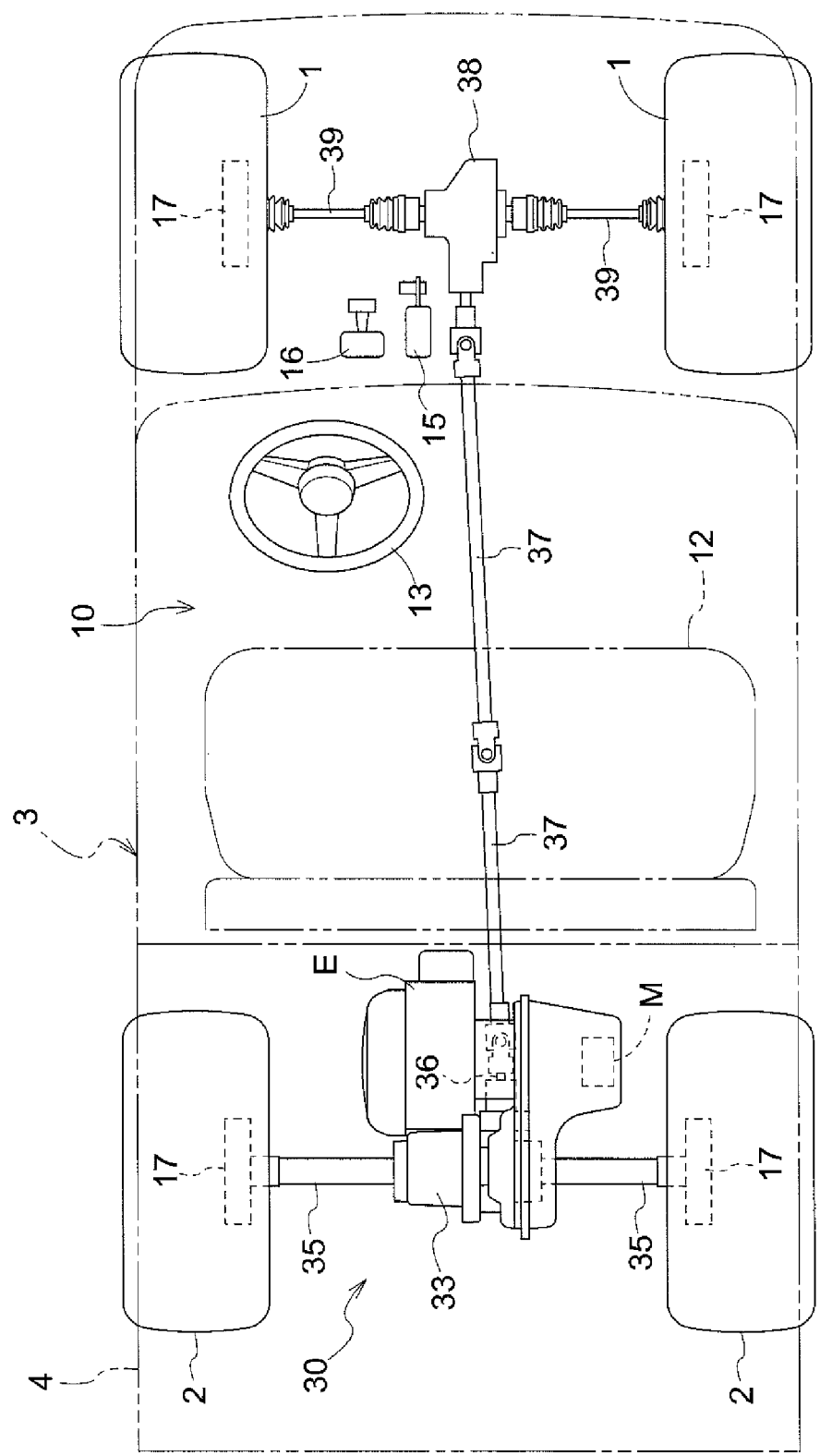
FIG. 2 is a plane view showing a power transmission arrangement of the utility vehicle.

As shown in FIG. 1 and FIG. 2, in a utility vehicle (will be referred to as "a work vehicle" hereinafter), a pair of left and right steerable front wheels 1 and a pair of left and right rear wheels 2 are mounted on a vehicle body 3 and a driver's section 10 is provided at the center of this vehicle body 3 and a load carrier 4 is provided at the rear portion of the vehicle body 3. And, at a position downwardly of this load carrier 4, an engine section 30 is provided.

This work vehicle is configured as a four-wheel drive type wherein the driving power from the engine section 30 is transmitted to the front wheels 1 and the rear wheels 2 and the vehicle may be used in works for various purposes such as an agricultural work, a transporting work, etc. At the position surrounding the driver's section 10, there is provided a protective frame 11 for protecting the driver's section 10.

The load carrier 4 has a function of lifting up the front end thereof for dumping a mounted load and has its rear end portion supported to the vehicle body 3 to be pivotable axially. Further, there is provided a hydraulic actuator (not shown) for lifting up/down the front end side of the load carrier 4.

The driver's section 10 includes a driver's seat 12 where a driver is to be seated, a steering wheel 13 for steering control of the front wheels 1, a speed changer lever 14, an accelerator pedal 15 for controlling traveling speed, and a brake pedal 16 for operating brake devices 17 for the front wheels 1 and the rear wheels 2. Incidentally, although a passenger's (assistant's) seat may be provided in the vicinity of the driver's seat 12, at this driver's section 10, there is provided a bench seat consisting of a single laterally elongate seat base and a single laterally elongate seat back.

The speed changer lever 14 realizes setting of a traveling speed and switchover between forward traveling and reverse traveling by a single lever operation. However, at the driver's section 10, there may be provided two levers, one for speed changing and the other for forward/reverse switchover.

Figure 3:
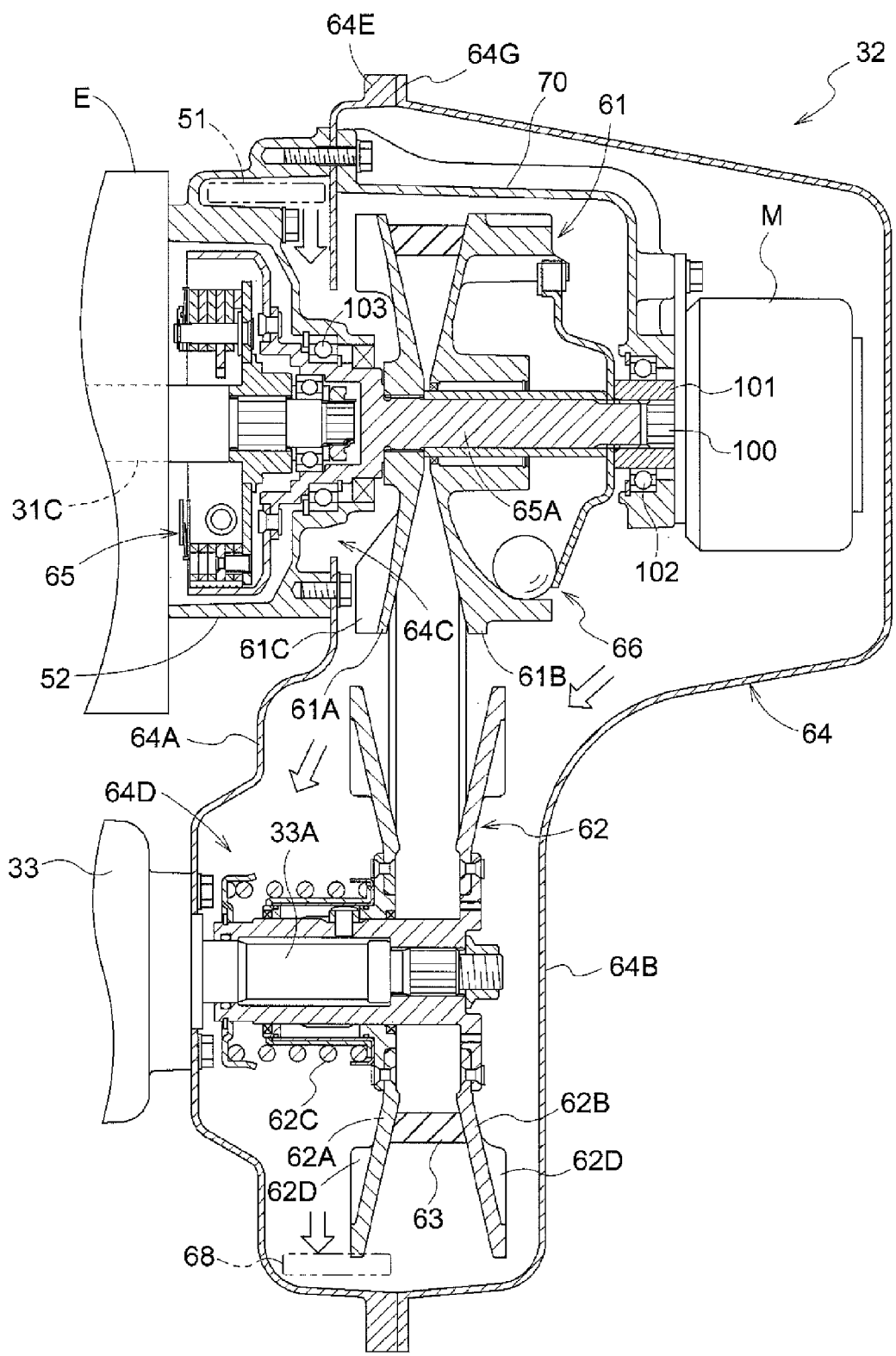
FIG. 3 is a side view showing layout of an engine, a motor, a belt stepless speed changer mechanism, etc.

As shown in FIG. 2 and FIG. 3, the engine section 30 includes an air-cooled engine E, a motor, a dry belt stepless speed changer 32 and a transmission case 33. The transmission case 33 incorporates therein a gear speed changer mechanism (not shown) and a differential mechanism (not shown). At the lower end of this transmission case 33, there are provided a pair of left and right rear wheel driving shafts 34 for transmitting the driving power from the differential mechanism to the rear wheels 2 and a rear axle case 35 accommodating the rear wheel driving shafts 34.

At the lower end portion of the transmission case 33, there is provided a PTO (power take-off) shaft 36 projecting forwardly. At a lower portion of the vehicle body 3, there is provided an intermediate shaft 37 receiving the driving power of the PTO shaft 36. And, at a front portion of the vehicle body 3, there are provided a differential case 38 receiving the driving power of the intermediate shaft 37 and front wheel driving shafts 39 for transmitting the driving power of the differential case 38 to the front wheels 1.

Between the PTO shaft 36 of the transmission case 33 and the intermediate shaft 37, there is incorporated a universal joint of e.g. the cardan jointed type. Similarly, universal joints are provided also between the front and rear portions of the intermediate shaft 37 and the intermediate shaft 37 and the input shaft of the differential case 38 and also between the front wheel driving shaft 39 and the axle of the front wheel 1.

Though not shown, the transmission case 33 includes a clutch mechanism capable of switch over between a transmitting state for transmitting the driving power to the PTO shaft 36 and a non-transmitting state for blocking the power transmission thereto. This clutch mechanism can effect such switchover by a driver's operation. As the clutch mechanism is set to the transmitting state, there is realized a four-wheel driving state in which the rear wheels 2 and the front wheels 1 are driven simultaneously. When the clutch mechanism is set to the non-transmitting state, there is realized a two-wheel driving state in which the rear wheels 2 alone are driven.

Incidentally, at the axial end of each of the pair of left and right front wheel driving shafts 39 and at the axial end of each one of the pair of left and right rear wheel driving shafts 34, there is provided a braking device 17. These braking devices 17 function to apply a braking force to the front wheels 1 and the rear wheels 2 in response to an operation on the braking pedal 19.

The gear speed changer mechanism (not shown) of the transmission case 33 is operable by an operation on the speed changer lever 14. This gear speed changer mechanism realizes change of the traveling speed of the vehicle body 3 as well as the switchover of traveling direction (forward traveling and reverse traveling).

As shown in FIG. 2 and FIG. 3, in the engine section 3, the engine E is disposed with the crank shaft 31C assuming a lateral orientation. And, at the position rearwardly adjacent the crank shaft 31C, the transmission case 33 is disposed with an input shaft 33A assuming a lateral orientation. Rearwardly of this transmission case 33, there is disposed a laterally elongate muffler 40 (see FIG. 1). At a position laterally of this engine E and the transmission case 33, there is provided the belt stepless speed changer device 32. And, across this belt stepless speed changer device 32 and on the side opposite the engine E and the transmission case 33, the motor M is disposed.

As shown in FIG. 3, the belt stepless speed changer device 32 includes a drive pulley 61 (corresponding to what is defined as "a driving rotary body" in the context of the present invention) capable of varying its belt winding diameter, a driven pulley 62 (corresponding to what is defined as "a driven rotary body" in the context of the present invention) also capable of varying its belt winding diameter, and a length of rubber endless belt 63 wound around the drive pulley 61 and the driven pulley 62. These components are accommodated in a speed changer case 64. Incidentally, a metal belt can be employed as the endless belt 63.

There is provided a centrifugal clutch 65 receiving the rotational driving power from the crank shaft 31C of the engine E. And, the drive pulley 61 is mounted on an output shaft 65A (corresponding to what is defined as "a first shaft member" in the context of the present invention) of this centrifugal clutch 65. The output shaft 65A has its engine-side end vicinity portion rotatably supported by a bearing 103 provided in the clutch case 52 and has its motor M-side end vicinity portion rotatably supported by a bearing 102 provided in a support bracket 70. The driven pulley 62 is mounted on an input shaft 33A (corresponding to what is defined as "a second shaft member" in the context of the present invention) of the transmission case 33. An output shaft 65A of the centrifugal clutch 65 is mounted coaxially with the crank shaft 31C.

The centrifugal clutch 65 is set under the non-transmitting state when the rotational speed of the crank shaft 31C is below a setpoint value and does not transmit the rotational power of the crank shaft 31C to the output shaft 65A. Further, when the rotational speed of the crank shaft 31C exceeds the setpoint value, the clutch is rendered into the connected state, thus effecting transmission of the rotational power of the crank shaft 31C to the output shaft 65A.

The drive pulley 61 includes a fixed sheave 61A disposed on the base end side (the side in the vicinity of the engine E) of the output shaft 65A and a movable sheave 61B disposed on the leading end side of the output shaft 65A. Further, at the projecting end of the output shaft 65A, there is provided an winding diameter adjustment mechanism 66 for adjusting the position of the movable sheave 61B.

This winding diameter adjustment mechanism 66 increases the belt winding diameter of the drive pulley 61 by moving the movable sheave 61B closer to the fixed sheave 61A as the rotational speed of the output shaft 65A becomes higher. Conversely, the winding radium adjustment mechanism 66 decreases the belt winding diameter of the drive pulley 61 by moving the movable sheave 61B away from the fixed sheave 61A as the rotational speed of the output shaft 65A becomes lower.

The driven pulley 62 includes a movable sheave 62A disposed on the base end side (the side in the vicinity of the transmission case 33) of the input shaft 33A, a fixed sheave 62B disposed on the leading end side of the input shaft 33A, and a coil spring 62C for applying an urging force in the direction for causing the movable sheave 62A closer to the fixed sheave 62B.

This coil spring 62C applies the urging force for position-fixing the movable sheave 62A of the driven pulley 62 in accordance with the tension applied on the endless belt 63. More particularly, in association with a change in the belt winding diameter of the drive pulley 61, there occurs a corresponding change in the tension applied on the endless belt 63. As this tension increases, the movable sheave 62A is caused to be moved away from the fixed sheave 62B. As the tension decreases, the movable sheave 62A is caused to be moved closer to the fixed sheave 62B. Therefore, when the belt winding diameter of the drive pulley 61 is small, the belt winding diameter of the driven pulley 62 is set to a large value. Conversely, when the belt winding diameter of the drive pulley 61 increases, the belt winding diameter of the driven pulley 62 is set to a small value.

Figure 4:
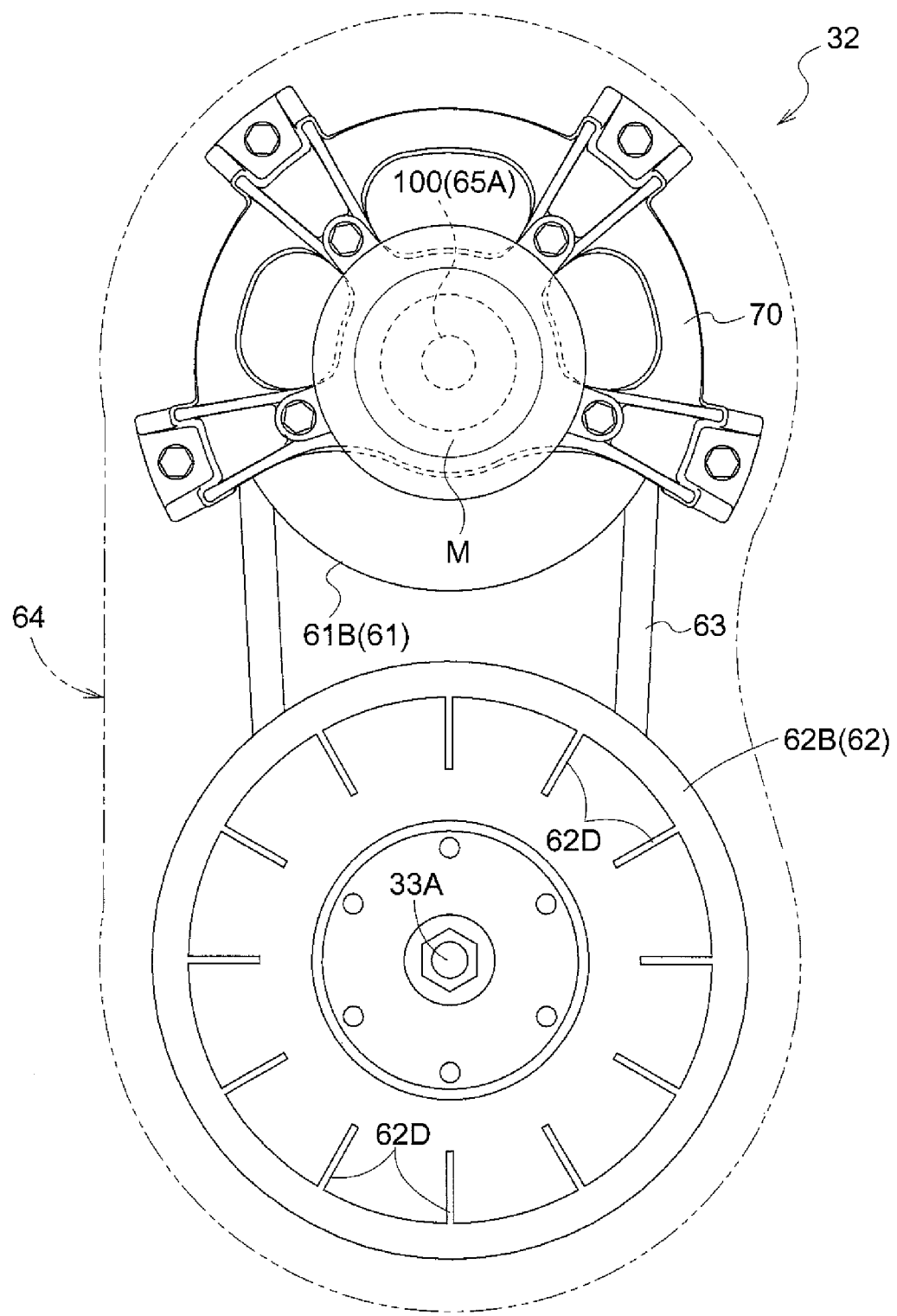
FIG. 4 is a plane view showing layout of the engine, the motor, the belt stepless speed changer mechanism, etc.

As shown in FIG. 3 and FIG. 4, the motor M is disposed on the side opposite the engine E across the drive pulley 61. And, this motor M is disposed with a driving shaft 100 being oriented in the lateral direction (the side of the drive pulley 61). In the instant embodiment, the motor M is attached to the outer end portion of the support bracket 70 with bolts or the like. Further, the driving shaft 100 is mounted coaxially with the output shaft 65A. The output shaft 65A is extended to the driving shaft 100 and between the driving shaft 100 and the output shaft 65A, a coupler 101 is provided. This coupler 101 and the driving shaft 100 and also the coupler 101 and the output shaft 65A are splined to each other, respectively. As the coupler 101 is supported to the bearing 102 provided in the support bracket 70, the driving shaft 100 and the output shaft 65A are supported to be rotatable in unison.

As shown in FIG. 3, the speed changer case 64 (corresponding to what is defined as "a case member" in the context of the present invention) includes a case body 64A supported to the vehicle (at least one of the transmission case 33 and the engine E) and a cover body 64B detachably supported to this case body 64A. Further, the clutch case 52 surrounding the centrifugal clutch 65 is connected to the cylinder block of the engine E, and this clutch case 52 is connected to the case body 64A of the speed changer case 64. Further, to the case body 64A and the clutch case 52, the support bracket 70 is attached with e.g. bolts, etc.

The cover body 64B has a shape capable of accommodating the motor M, the drive pulley 61, the winding diameter adjustment mechanism 65 and the driven pulley 62 and has an auxiliary flange face 64G in its outer circumference. With this speed changer case 64, with a seal member (not shown) sandwiched between a main flange face 64E and the auxiliary flange face 64G, the case body 64A and the cover body 64B are connected to each other with e.g. bolts, etc.

As described above, from one lateral side of the engine toward the outer side in the vehicle width direction, the centrifugal clutch 65, the drive pulley 61 and the motor M are disposed in this mentioned order and on the outer side of the motor M, the speed changer case 64 (cover body 64B) is disposed.

As shown in FIG. 3, cooling air is introduced into the speed changer case 64. More particularly, the clutch case forms an air intake portion 51 and cooling air through an air cleaner or the like is suctioned via the air intake portion 51 and introduced into the speed changer cover 64 via a cooling air introduction opening 64C.

In the above, the cooling air introduction opening 64C is formed in an area surrounding the output shaft 65A. Also, at the portion of the fixed sheave 61A of the drive pulley 61 opposed to the cooling air introduction opening 64C, there are formed many air intake fins 61C. The movable sheave 62A and the fixed sheave 64B form many reinforcement ribs 62D capable of functioning as air exhaust fins.

With the above-described arrangement, in association with driving rotation of the drive pulley 61, the air intake fins 61C generate a negative pressure, which pressure in turn draws the cooling air into the speed changer case 64 through the cooling air introduction opening 64C. The cooling air thus drawn in then flows inside the speed changer case 64 in the direction from the drive pulley 61 toward the driven pulley 62. In the course of this flowing, the cooling air comes into contact with the drive pulley 61, the driven pulley 62, the endless belt 63 and the motor M, thus taking heat therefrom and cooling them. Then, the cooling air is exhausted to the outside of the speed changer case 64 via an exhaust portion 68 formed in the case body 64A downwardly of the driven pulley 62. As the motor M is disposed inside the speed changer case 64 in the manner described above, the motor M can be effectively cooled by the cooling air provided originally for the belt stepless speed changer device 32.

Next, there will be explained one example of driving control of this work vehicle. This work vehicle is driven by the motor M at the time of low speed (at the time of low rotational speed). At the time of high speed (at the time of high rotational speed), the vehicle is driven by the engine E (or by the engine E and the motor M). More particularly, when the accelerator pedal 15 is operated, electric power is supplied to the motor M by an electric power supply unit (not shown), whereby the motor M is rotated. Until the accelerator pedal 15 is operated to a predetermined operational position (a first predetermined position), the engine E is not driven, and only the motor M is driven at a rotational speed corresponding to the operational position of the accelerator pedal 15. In the course of this, as the engine E is not being driven, the rotational speed of the engine E is blow a setpoint value and the centrifugal clutch 65 is under its non-transmitting state. Therefore, the rotational driving power of the motor M is inputted via the belt stepless speed changer device 32 to the input shaft 33A of the transmission case 33, whereby the work vehicle is driven.

When the accelerator pedal 15 is operated to the predetermined operational position (the first predetermined position), the engine is started and the engine is rotatably driven at the rotational speed corresponding to the operational position of the accelerator pedal 15. However, until the accelerator pedal 15 is operated to an operational position (a second predetermined position) corresponding to the set value of the rotational speed of the engine at which the centrifugal clutch 65 enters its engaged state, the rotational speed of the engine is blow the setpoint value and the centrifugal clutch 65 remains under the non-transmitting state. Therefore, the rotational driving power of the engine E (the crank shaft 31C) is not transmitted to the output shaft 65A. Accordingly, like the above-described case, the rotational driving power of the motor M is inputted via the belt stepless speed changer device 32 to the input shaft 33A of the transmission case 33, whereby the work vehicle is driven. When the operational position of the accelerator pedal 15 reaches the second predetermined position, the rotational speed of the engine E reaches the setpoint value and the centrifugal clutch 65 enters the transmitting state, whereby the rotational power of the engine (the crank shaft 31C) is transmitted to the output shaft 65A. When the accelerator pedal 15 is operated beyond the second predetermined position, the engine E and the motor M are rotatably driven at the rotational speeds corresponding to the operational position of the accelerator pedal 15, so that the rotational driving powers of the engine E and the motor M are inputted via the belt stepless speed changer device 32 to the input shaft 33A of the transmission case 33, whereby the work vehicle is driven.

At the time of braking of the work vehicle, the driving of the engine E is stopped (the rotational speed of the engine falls below the setpoint value) and the centrifugal clutch 65 enters the non-transmitting state. Then, by the regenerative braking action of the motor M, a braking operation or a speed reduction is effected. And, an amount of electric power generated in this will be stored in the electric power storage unit.

In the above-described arrangement, when the operational amount of the accelerator pedal 15 is small, the output shaft 65A is rotated at a low speed. Therefore, the winding diameter adjustment mechanism 66 sets the belt winding diameter of the drive pulley 61 to a small value and sets the belt winding diameter of the drive pulley 62 to a large value in operative association therewith. With this, the driving powers of the motor M and the engine E are transmitted at low speeds (with high speed reducing ratios) to the input shaft 33A of the transmission case 33. And, when the operational amount of the accelerator pedal 15 increases, in association with increase in the rotational speed of the output shaft 65A, the winding diameter adjustment mechanism 66 increases the belt winding diameter of the drive pulley 61 and sets the belt winding diameter of the driven pulley 62 to a smaller value in operative association therewith. With this, the driving powers of the motor M and the engine E are transmitted at high speeds (with low speed reducing ratios) to the input shaft 33A of the transmission case 33.

Incidentally, the first predetermined position and the second predetermined position described above may be set to a same position. In this case, the engine E will be started at the rotational speed of the setpoint value and the rotational driving powers of the engine E and the motor M are inputted via the belt stepless speed changer device 32 to the input shaft 33A of the transmission case 33, whereby the work vehicle is driven.

Also, the electric power supply to the motor M may be stopped at the time of the accelerator pedal 15 reaching the second predetermined position or reaching a third predetermined position slightly beyond the second predetermined position. In this case, the motor will be rotated by the rotational driving power of the engine (crank shaft 31C) and functions as an electric power generator. And, the amount of electric power thus obtained may be stored in the electric power storage unit (not shown).

The controlling operations of the start of the motor M and the engine E as well as the rotational speeds of the motor M and the engine E are effected by e.g. a control unit (not shown). More particularly, the accelerator pedal 15 will be provided with an operational position detecting means such as a rotation sensor, and the control unit will effect the above-described control operations based on a detection signal from the operational position detecting means. Incidentally, in the foregoing embodiment, there has been described a case where operations are effected by the single accelerator pedal 15. Instead, an accelerator pedal 15 for the motor M and an accelerator pedal 15 for the engine E may be provided with phases differing from each other, so that up to the above-described first predetermined position, only the accelerator pedal 15 for the motor M will be operated; and beyond the first predetermined position, both the accelerator pedal 15 for the motor M and the accelerator pedal 15 for the engine E will be operated.

Incidentally, the control of the rotational speed of the engine E is not limited to the above. Instead, this may use a mechanical governor. In case a single accelerator pedal 15 is employed, to this accelerator pedal 15, the governor for controlling the rotational speed of the engine E will be operably coupled, and an operational position detecting means will be provided for controlling the rotational speed of the motor M. In case the accelerator pedal 15 for the motor M and the accelerator pedal 15 for the engine E are provided separately, the governor will be coupled to the accelerator pedal 15 for the engine E and the operational position detecting means will be provided in the accelerator pedal 15 for the motor M.

In the foregoing embodiment, there has been described a case wherein the present invention is applied to a utility vehicle. However, the invention is not limited thereto. The present invention may be applied to vehicles in general, such as a work vehicle having a belt stepless speed changer device, etc.

[Second Embodiment]

Next, an embodiment of the present invention will be described with reference to the accompanying drawings.

In FIGS. 5-9, there is shown a hybrid system 201 usable as an engine section to be mounted downwardly of a load carrier of a four-wheel drive work vehicle.

This hybrid system 201 is configured as a power transmission apparatus for transmitting powers of an engine E and a motor generator 208 to a transmission M via a stepless speed changer mechanism 205.

To the side face of the engine E from which a crank shaft 203 (an output shaft) projects, there are connected a body 220a of an oil pump 220 and a clutch casing 204a of a clutch 204. And, to this clutch casing 204a, a motor case 208a of the motor generator 208 is fixed and to this motor case 208a, the input side of a speed changer case 219 of the stepless speed changer mechanism 5 is fixed.

As the engine E, there is employed a single cylinder air-cooled OHC type engine, and its crank shaft 203 extends through the oil pump 220 into the clutch casing 204a of the clutch 204 and is engaged with an input member 204A of the clutch 204, thus rotatably supporting an output member 204B.

The body 220a of the oil pump 220 forms a partition wall partitioning between the engine E and the clutch 204 and acts also as a bearing case for supporting the crank shaft 203.

The clutch 204 is configured as a power one-way automatic transmission type clutch which effects automatic transmission of the rotational power of the crank shaft 3 in one direction, but does not transmit the power in the opposite direction. For instance, there may be employed a centrifugal clutch which is rendered into a clutch engaged state when the rotational speed of the crank shaft 3 exceeds a predetermined rotational speed or a one-way clutch (free wheel) which constantly transmits the rotation of the crank shaft 3 but is rendered free in the opposite direction.

In this embodiment, a centrifugal wet type clutch is employed as the clutch 204. Based on a centrifugal force which increases according to the rotational speed of the crank shaft 203, the clutch transmits the rotational driving force of the crank shaft 203 to the downstream side.

In the clutch 204, within a clutch chamber surrounded by the clutch casing 204a, an input member 204A and an output member 204B are disposed and the input member 204A is engaged and fixed on the crank shaft 203 and includes a plurality of pivotable clutch discs 221. The output member 204B has a cup-like shape covering the clutch discs 221 and is rotatably supported to an end of the crank shaft 203 via a bearing 222 and, at the same, is rotatably supported to the clutch casing 4a via a bearing 223.

With the clutch 204 in operation, the input member 204A is driven by the crank shaft 203 and in response to rotation of the input member 204A, the clutch discs 221 are pivoted by the centrifugal force to come into contact with the output member 204B and the resultant friction causes the output member 204B to rotate, thus transmitting power.

The output member 204B is formed integral with a drive shaft 206 of the stepless speed changer mechanism 205. The drive shaft 206 has a rotor shaft portion 206A at the end thereof on the side of the clutch 204 and this rotor shaft portion 206A is connected to the output member 204B, and the output member 204B, the rotor shaft portion 204A and the drive shaft 206 have their axes coaxial with the axis of the crank shaft 203.

The rotor shaft portion 206A may be formed separate from the output member 204B and/or the drive shaft 206, and engaged and connected via a spline or the like. However, integral forming by casing or the like is more advantageous in terms of strength and cost.

The clutch casing 204a of the clutch 204 includes an inner case portion 204aA coaxial with the output shaft 204B and covering its outer radius and an outer case portion 204aB covering its outer side, the inner and outer case portions 204aA, 204aB being formed common at circumferential portions thereof and connected to each other on the side of the body 220a of the oil pump 220.

In the front portion of the clutch casing 204a, the outer case portion 204aB extends forwardly apart from the inner case portion 204aA in the front/rear direction of the work vehicle and forming an air flow introduction space 225 therebetween. The outer case portion 204ab includes, at a front portion thereof, an air inlet opening 226 communicated with the air flow introduction space 225. This air inlet opening 226 is connected via a duct with a suction air cleaner (not shown), so that during traveling of the work vehicle, ambient air is introduced in the air flow introduction space 223 via the air inlet opening 226 from the air cleaner, so that the inside of the clutch 204 can be air-cooled.

The inner and outer case portions 204aA, 204aB, at their engine E side ends thereof, are bolt-fixed to the body 220a and the end of the outer case portion 204aB on the side of the stepless speed changer mechanism 205 is bolt-fixed to the motor case 208a.

The motor generator 208 is disposed between the clutch 204 and the stepless speed changer mechanism 205 and connecting these with each other. The rotor 209 is engaged and fixed to the rotor shaft portion 206A of the drive shaft 206 and a stator 210 is fixed to the inner circumference of the motor case 208a by shrink fitting.

This motor generator 208 employs a synchronous motor (PMSM) having permanent magnets fixed to the rotor 209, e.g. a permanent magnet embedded type concentrated wound synchronous motor (IPM motor), and functions as a motor as the rotor 209 having permanent magnets embedded therein is driven in response to electric power supply to the stator 210 having concentrated wound oil.

When the rotor 209 is driven at the time of high speed rotation of the engine E or the rotor 209 is driven by the power from the stepless speed changer mechanism 205 at the time of braking, the motor generator 208 functions as a generator for obtaining electric power from the stator 210, so that electric power or regenerative energy can be obtained.

Figure 5:
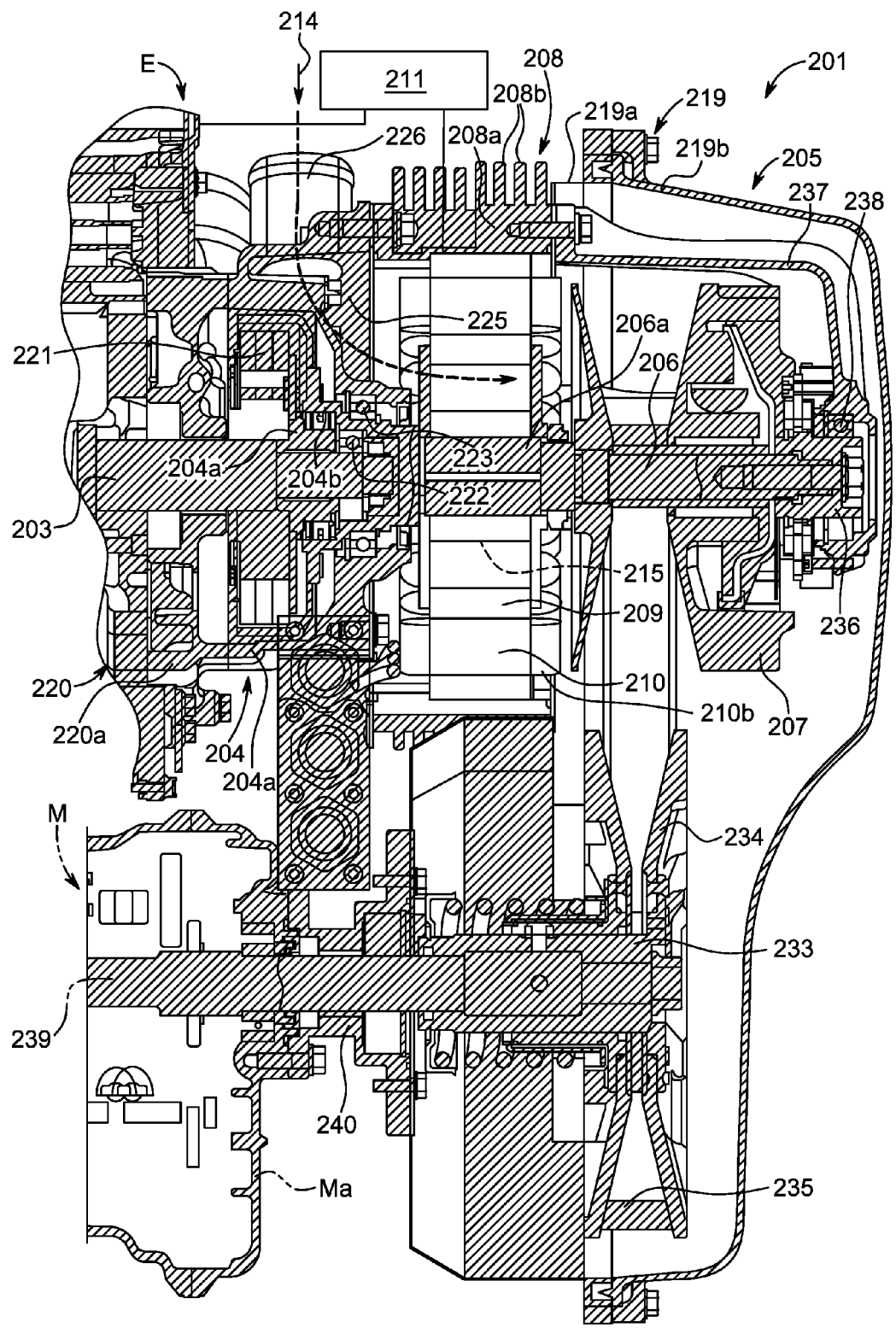
FIG. 5 is a general front view in section showing a second embodiment of the present invention.
Figure 6:
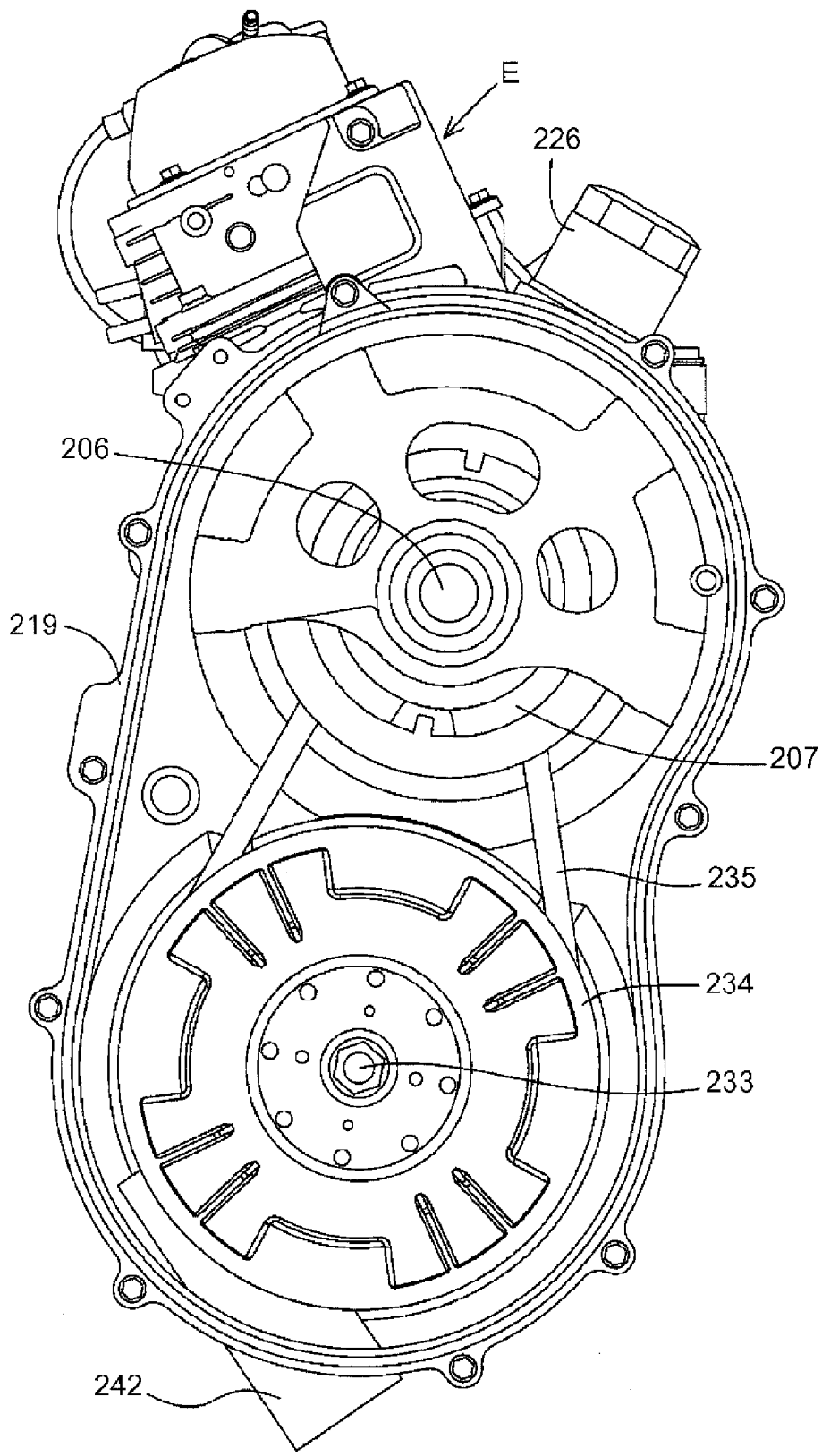
FIG. 6 is a general side view in section of the same.
Figure 7:
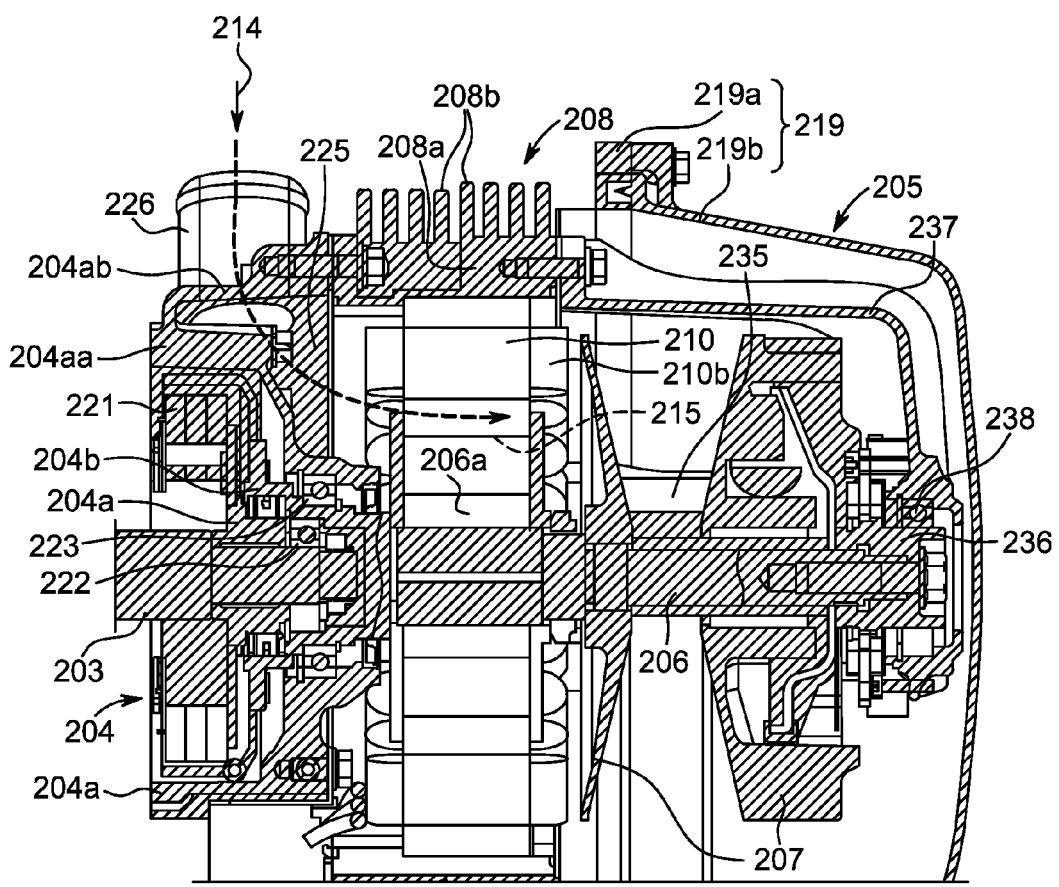
FIG. 7 is an enlarged front view in section showing principal portions of the same.
Figure 8:
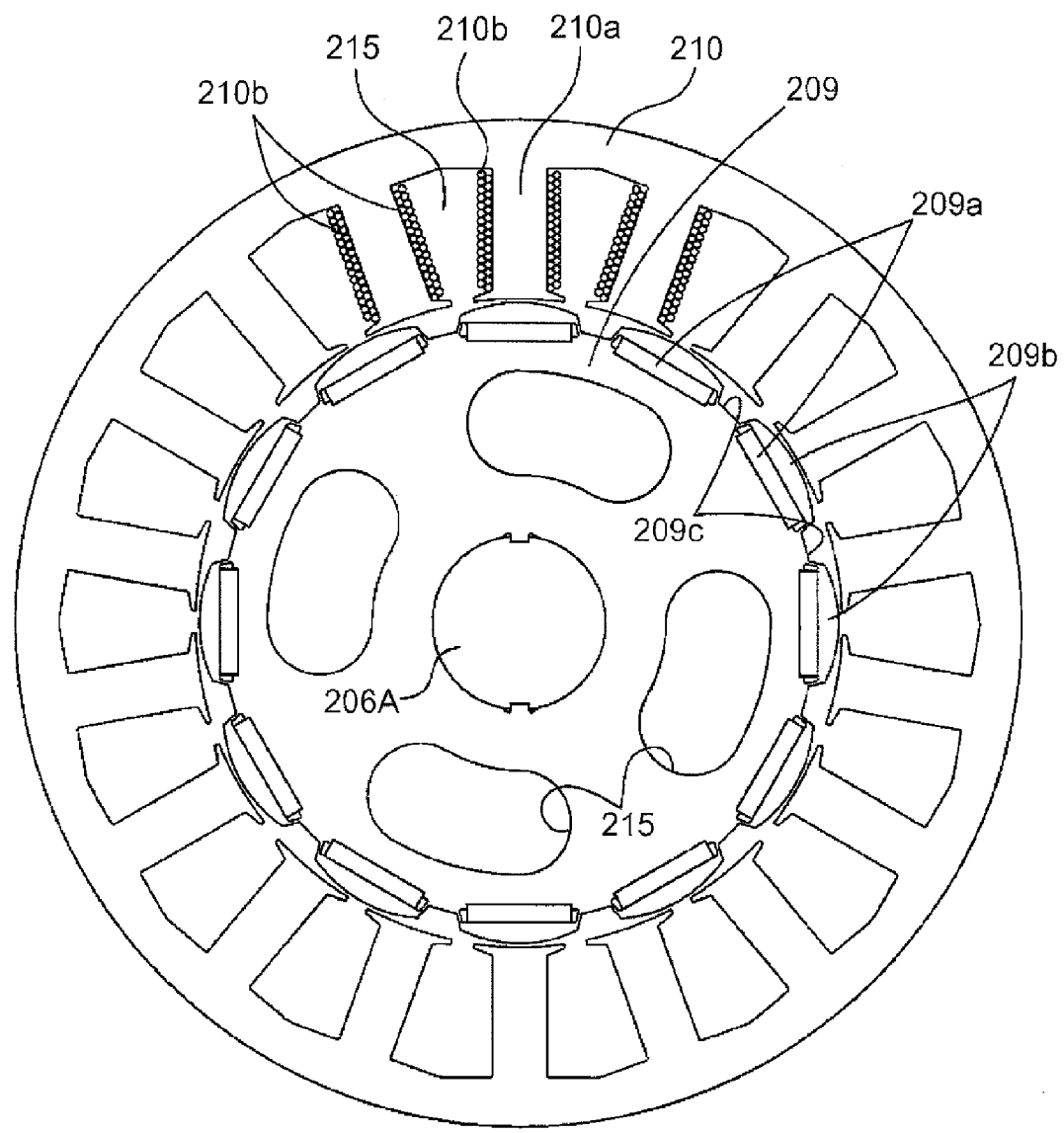
FIG. 8 is a section view of a motor generator.
Figure 9:
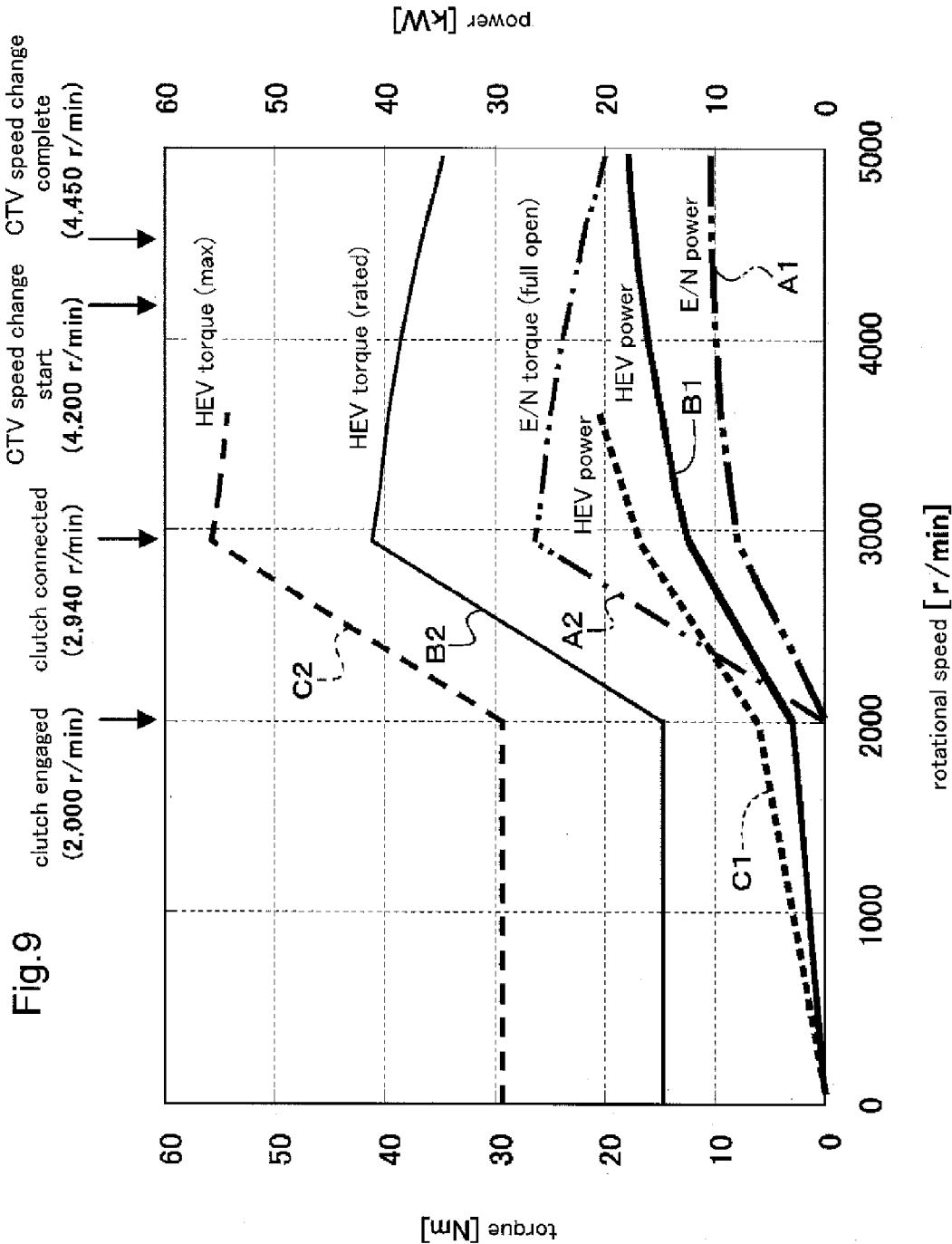
FIG. 9 is a graph showing torque-power relationship of the hybrid system.

In FIG. 5, referring more particularly to the rotor 209 of the motor generator 208, a plurality of thin silicon steel plates are stacked to form a rotor core and in the outer circumference of this rotor core, openings are formed with circumferential spacing from each other. And, in these openings, permanent magnets 209a are embedded. On the radially outer side of the disposing positions of the permanent magnets 209a, arch-shaped bulging portions 209b are formed and arc-shaped recessed portions 209c are formed between the disposing positions of the permanent magnets 209a for bridging the arch-shaped bulging portions 209b to each other, and the rotor 209 is placed in opposition to the inner circumferential face of the stator 210 with forming a small gap relative thereto.

The rotor 209, within its rotor core, defines a plurality of cooling air introduction holes 215, thus allowing flowing of the air from the air flow introduction space 225 of the clutch casing 204a along the axial direction. The gap between the rotor 209 and the stator 210 also forms a cooling air introduction hole 215.

Referring now to the stator 210, a plurality of thin electrode steel plates 210a are stacked to form a stator core, and a length of stator coil 210b is wound thereon by a predetermined number to form a concentrated winding, so that the stator 210 has a cylindrical shape. In this stator 210, the adjacent stator coil windings 210b form gaps and these gaps form cooling air introduction holes 215 that allow introduction of air from the air introduction space 225 of the clutch casing 204a along the axial direction.

In the motor generator 208, in the outer circumference of the motor case 208a, many fins 208b are formed, so that air-cooling from the outside is made possible by air at the time of traveling of the work vehicle.

Accordingly, the motor generator 208 has its outside air-cooled via the fins 208b and has its inside air-cooled by the air flow the air current introduction space 225 through the cooling air introduction holes 215 of the rotor 209 and the cooling air introduction openings 215 of the stator 210.

The belt stepless speed changer mechanism 205 includes a drive shaft 206 and a driven shaft 233 which extend parallel with each other, a drive pulley as a driving member 207 on the drive shaft 206, a driven pulley 234 on the driven shaft 233, an endless belt 235 wound around these two pulleys 207, 234, and a speed changer case 219 surrounding these components.

At an end portion of the drive shaft 206 opposite the rotor shaft portion 206A, an end shaft 236 is engaged and fixed, and this end shaft 236 is supported via a bearing 238 to a support member 237 fixed to the motor case 208a and the speed changer case 219.

The drive pulley 207 on the drive shaft 206 is axially slidable on the side of the end shaft portion 236 and is axially immovable on the side of the motor generator 208.

The driven shaft 233 is connected as being formed integral with or formed separately from the input haft 239 of the transmission M. The driven pulley 234 on the driven shaft 233 is axially slidable on the side of its axial end and is axially immovable on the side of the transmission M.

The speed changer case 219 includes a base case 219A and an outer case 219B which are fitted to each other in the form of a jam-filled wafers. The input side of the base case 219A, together with the support member 237, is fixed to the motor case 208a, and its output side is connected via a connection member 240 to the transmission case Ma of the transmission M. The input side of the outer case 219B covers the support member 237 and its output side covers the driven pulley 234.

Cooling air that has passed through the air introduction opening 226 of the clutch casing 204a enters the speed changer case 219 and cools the inner components of the belt stepless speed changer mechanism 205.

At a rear portion of the base case 219A (or the outer case 219B), there is provided an exhaust portion 242 forming communication between the inside and the outside, so that the cooling air that has cooled the belt stepless speed changer mechanism 205 can be exhausted to the outside.

The passageway extending from the air introduction opening 226 of the clutch casing 204a to the air introduction space 225, the cooling air introduction holes 215 of the motor generator 208, the space inside the speed changer case 219 to the exhaust portion 242 forms a cooling air passage 214 allowing flow of air flowing from the clutch casing 204a through the inside of the motor generator 208 to the inside of the speed changer mechanism 205.

The engine E and the motor generator 208 are connected to a controlling means 211, by which starting and rotation of the engine E and motor driving and generator regeneration operation of the motor generator 208 are controlled.

Referring now to FIGS. 5-9. there will be explained control operations by the controlling means 211 when the hybrid system 201 is mounted on a work vehicle for operation. Incidentally, in FIG. 9, three curved lines shown on the right-lower side represent powers and three curved lines shown on the right-upper side represent torques, respectively.

When the engine E alone is operated (shown by the two-dot chain line A1 in FIG. 9), under an idling condition below 2000 rpm after startup of the engine E, the rotation of the crank shaft 203 does not render the clutch 204 into its engaged state, and the belt stepless speed changer mechanism 205 is stopped and the work vehicle keeps its stop state.

When the rotational speed of the engine E is increased to reach about 2000 rpm, the clutch 204 begins to become engaged, and as the rotational speed increases, the slippage of the clutch decreases and there occurs a sudden torque rise (maximum torque: 26 Nm) until the speed becomes 3000 rpm approximately (e.g. 2940 rpm). At the rotational speed of 3000 rpm approximately, the centrifugal clutch 204 becomes engaged to transmit or feed the engine power to the belt stepless speed changer mechanism 205 (shown by the two-dot chain line A2 in FIG. 9).

When the vehicle speed is increased to about 10 km/h (the maximum torque: 26 Nm), thereafter, the vehicle speed is changed by the stepless speed changer mechanism 205 and the speed reaches 40 km/h.

When the engine E alone is operated, the motor generator 8 can provide the generator function, not providing the motor function. For instance, when the engine E reaches an intermediate/high speed rotation of 2000 rpm or higher, the centrifugal clutch 204 will engage and the rotor 209 will rotate. Hence, electric power can be collected from the stator 210, so that creeping travel of the work vehicle and electric power generation can proceed simultaneously.

When a hybrid operation using the engine E and the motor generator 8 is effected, the motor output of the motor generator 208 can be changed from the torque of approximately 15 Nm as the rated operation to the maximum torque of about 30 Nm.

In case a rated operation is effected (shown by the solid line B1 in FIG. 9), the motor generator 8 can drive the drive shaft 206 of the stepless speed changer mechanism 205 even if the rotational speed of the rotor 209 ranges from 0 to 200 rpm and irrespectively of the engaged/disengaged state of the centrifugal clutch 204. And, even if the rotational speed of the rotor 209 is 200 rpm (same for the rotational speed of the output member 204B of the centrifugal clutch 204), there can be generated a motor power of 3 to 4 kW.

This motor driving by the motor generator 208 reinforces the rotation of the engine E and with addition of the individual torque of the engine to the torque of the motor generator 208, it becomes possible to provide a hybrid power (shown by the solid line B2 in FIG. 9) which provides from 30 to 80% addition to the individual engine power to the stepless speed changer mechanism 205.

At the time of maximum power operation (shown by the dot line C1 in FIG. 9), the motor generator 208 can provide acceleration from the vehicle speed: 0 km/h up to 30 Nm exceeding the engine individual torque, so even if the rotational speed of the rotor 209 is 200 rpm, there is generated a torque from 6 to 8 Nm, thus strongly reinforcing the rotation of the engine E (hybrid function). With this hybrid function, it is possible to provide the maximum hybrid power (shown by the dot line C2 in FIG. 9) which is about two times greater than the engine power at the time of engine only operation to the stepless speed changer device 205, so that a sudden increase in the vehicle speed is made possible.

When driving is done only by the motor function of the motor generator 208, that is, even when the engine E is stopped or under an idling state, the motor generator 208 can be used for providing the drive shaft 206 with a rated torque of 15 Nm to the maximum torque of 30 Nm and can generative a motor power from 3 to 8 kW for allowing the vehicle to travel and speed change operation by the stepless speed changer 205 is also possible.

In the case of driving only by the motor function of the motor generator 208, even if the output member 204B of the clutch 204 is driven, the input member 204A is not driven, so that there occurs no rotation of the crank shaft 203, thus no waste of motor power by the engine E.

When the work vehicle is decelerated or braked, the rotational power from the stepless speed changer mechanism 205 drives the rotor 209 and the motor generator 208 is rendered into the state of regenerator function, that is, braking energy regeneration state, so that an amount of electric power is collected from the stator 210.

In case a one-way clutch is employed as the clutch 204, the transmission M will be provided with a clutch such as a friction clutch, which is capable of transmitting or non-transmitting power. During rotation of the engine E, the rotor 209 and the drive shaft 206 are driven and power is transmitted to the belt stepless speed changer mechanism 205. In the course of this, if the motor generator 208 is caused to function as a motor, it is possible to obtain the hybrid power. Further, if the motor generator 208 is caused to function as a generator, it is possible to obtain electric power.

At the time of speed reduction or braking, in case the rotational speed of the rotor 209 is higher than that of the crank shaft 203, the motor generator 208 can collect energy; and when the rotational speed of the rotor 209 drops, rotational resistance is applied to the crank shaft 203 via the one-way clutch. In this, idling of the engine E can be stopped.

If the motor generator 208 is caused to function as a motor without starting of the engine E, the work vehicle can be caused to make a start or creeping without driving the crank shaft 203 by the one-way clutch.

As described above, with the hybrid system 201, by controlling the engine E and the motor generator 208 by the controlling means 211, the motor generator 208 can be caused to provide the motor function with the rotor 209 providing the motor driving at the time of stop or low speed or high speed rotation of the engine E, so that the motor generator 208 acts as an engine substitute drive source or engine auxiliary drive source. At the time of intermediate or high speed rotation of the engine E, the motor generator 208 is caused to provide the generator function with the rotor 209 being generator-driven by the power from the stepless speed changer mechanism 205, so that the motor generator 208 can act as an electric power generator for engine driving and regenerative braking.

In the present invention, the shapes and positional relationships in the front/rear, left/right and upper/lower directions of the respective components in the foregoing embodiment are best when provided as illustrated in FIGS. 5-9. However, the present invention is not limited to the foregoing embodiment. Various modifications of the components and arrangements are possible singly or in combination.

For instance, instead of the belt stepless speed changer mechanism 205, a planetary gear type stepless speed changer device or any other stepless speed changer mechanism can be employed.

[Third Embodiment]

Next, a third embodiment of the present invention will be described with reference to the accompanying drawings.

Figure 10:
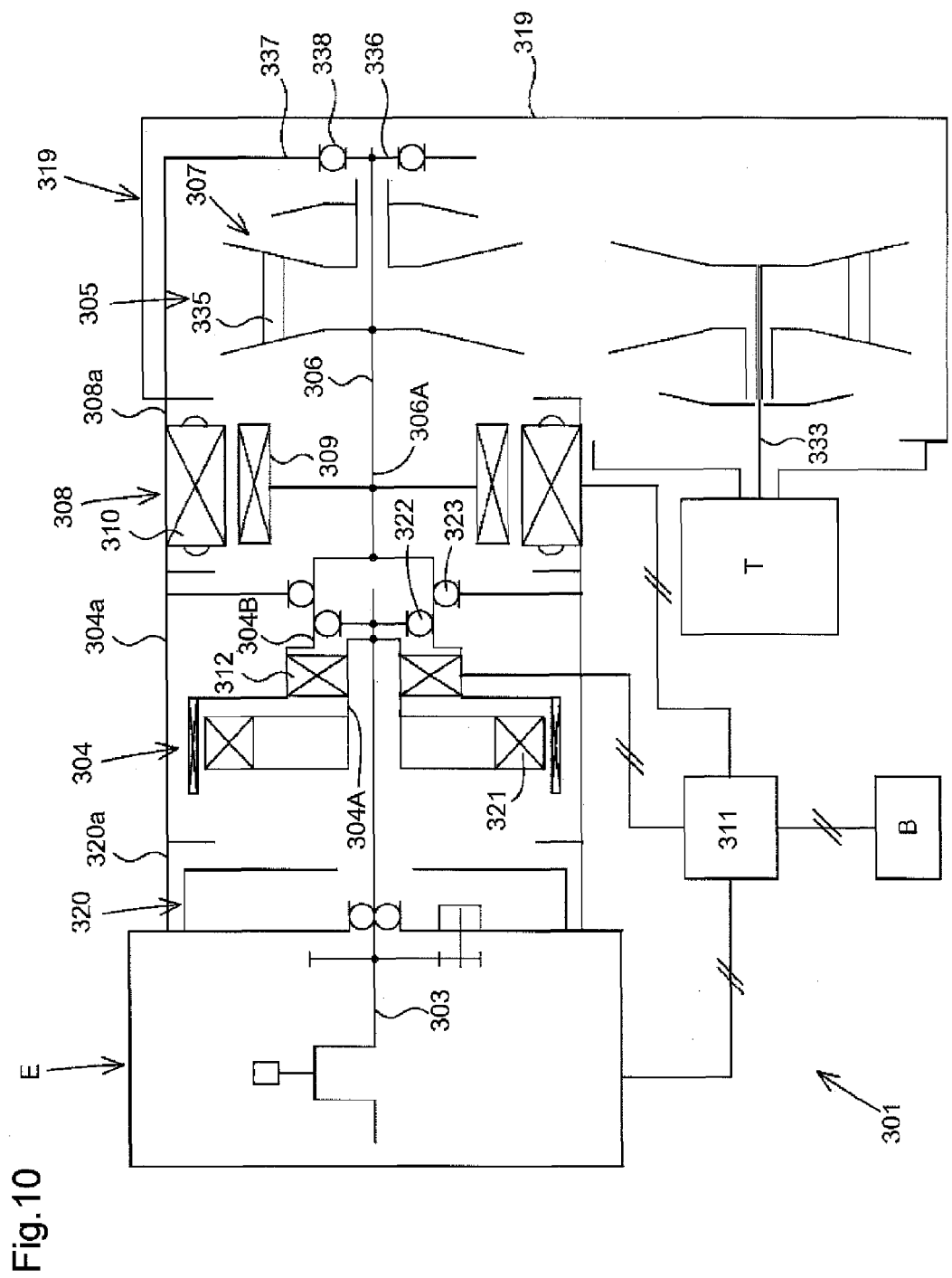
FIG. 10 is a general explanatory view showing a third embodiment of the present invention.

In FIGS. 10 and 11, there is shown a driving apparatus 301 for a traveling vehicle applicable as an engine section mounted downwardly of a load carrier of a four-wheel drive work vehicle.

This driving apparatus 301 for a traveling vehicle is configured as a power transmission apparatus for transmitting powers of an engine E and a motor generator 308 to a transmission T via a stepless speed changer mechanism 5. The speed changer mechanism 5 is a belt stepless speed changer mechanism (CVT).

To the side face of the engine E from which an output shaft (crank shaft) 303 projects, there are connected a body 320a of an oil pump 320 and a clutch casing 304a of a clutch 304. And, to this clutch casing 304a, a motor case 308a of the motor generator 308 is fixed and to this motor case 308a, the input side of a speed changer case 319 of the stepless speed changer mechanism 305 is fixed.

As the engine E, there is employed a single cylinder air-cooled OHC type engine, and its propelling shaft 303 mounts a gear 316, which is meshed with an input gear 317 of the oil pump 320. The propelling shaft 303 extends through the oil pump 320. A damper can be connected to the crank shaft of the engine E. In that case, the output shaft of the damper becomes the propelling shaft 303.

The propelling shaft 303 extends into the clutch casing 304a of the clutch 304 and is engaged with an input member 304A of the clutch 304, thus rotatably supporting an output member 304B.

The centrifugal clutch 304 is configured as a power one-way automatic transmission type wet clutch which effects automatic transmission of the rotational power of the crank shaft 303 in one direction, but does not transmit the power in the opposite direction. When the rotational speed of the propelling shaft 303 exceeds a predetermined rotational speed, the clutch is rendered into a clutch-engaged state; and based on a centrifugal force which increases according to the rotational speed of the propelling shaft 303, the clutch transmits the rotational driving force of the propelling shaft 303 to the downstream side.

In the centrifugal clutch 304, within a clutch chamber surrounded by the clutch casing 304a, an input member 304A and an output member 304B are disposed and the input member 304A is engaged and fixed on the propelling shaft 303 and includes a plurality of pivotable clutch discs 321. The output member 304B has a cup-like shape covering the clutch discs 321 and is rotatably supported to an end of the propelling shaft 303 via a bearing 322 and, at the same, is rotatably supported to the clutch casing 304a via a bearing 323.

With the centrifugal clutch 304 in operation, the input member 304A is driven by the propelling shaft 303 and in response to rotation of the input member 304A, the clutch discs 321 are pivoted by the centrifugal force to come into contact with the output member 304B and the resultant friction causes the output member 304B to rotate, thus transmitting power.

Between the shaft engaging portion of the input member 304A of the centrifugal clutch 304 and the output member 304B covering this, there is provided an electromagnetic clutch 312 for establishing/breaking power transmission.

The output member 304B of the centrifugal clutch 304 is connected integrally (or formed integrally) with a drive shaft 306 of the stepless speed changer mechanism 305. The drive shaft 306 has a rotor shaft portion 306A at the end thereof on the side of the centrifugal clutch 4 and this rotor shaft portion 306A is connected to the output member 304B, and the output member 304B, the rotor shaft portion 306A and the drive shaft 306 have their axes coaxial with the axis of the propelling shaft 303.

The rotor shaft portion 306A may be formed separate from the output member 304B and/or the drive shaft 306, and engaged and connected via a spline or the like. However, integral forming by casing or the like is more advantageous in terms of strength and cost.

The motor generator 308 is disposed between the centrifugal clutch 304 and the stepless speed changer mechanism 305 and connecting these with each other. The rotor 309 is engaged and fixed to the rotor shaft portion 306A of the drive shaft 306 and a stator 310 is fixed to the inner circumference of the motor case 308a by shrink fitting.

This motor generator 308 employs a synchronous motor (PMSM) having permanent magnets fixed to the rotor 309, e.g. a permanent magnet embedded type concentrated wound synchronous motor (IPM motor), and functions as a motor as the rotor 309 having permanent magnets embedded therein is driven in response to electric power supply to the stator 310 having concentrated wound oil.

Motor driving by the motor generator 308 drives the drive shaft 306 via rotation of the rotor shaft portion 306A, thus being transmitted to the speed changer mechanism 305 to drive the output member 304A, so that with switching ON of the electromagnetic clutch 312, the engine E can be started (cranking).

With the motor generator 308, when the rotor 309 is driven forwardly (forward torque transmitting direction) at the time of rotation of the engine E or when the rotor 309 is driven by reverse driving (reverse torque transmitting direction) from the speed changer mechanism 305 at the time of e.g. braking, the motor generator 308 functions as a generator for obtaining electric power from the stator 310, so that the electric power, regenerative energy are collected to charge a battery B.

The belt stepless speed changer mechanism 305 includes the drive shaft 306 and a driven shaft 333 which extend parallel with each other, a drive pulley as a driving member 307 on the drive shaft 306, a driven pulley 334 on the driven shaft 333, an endless belt 335 wound around these two pulleys 307, 334, and a speed changer case 319 surrounding these components.

At an end portion of the drive shaft 306 opposite the rotor shaft portion 306A, an end shaft 336 is engaged and fixed, and this end shaft 336 is supported via a bearing 338 to a support member 337 fixed to the motor case 308a and the speed changer case 319.

The drive pulley 307 on the drive shaft 306 is axially slidable on the side of the end shaft portion 336 and is axially immovable on the side of the motor generator 308.

The driven shaft 333 is connected as being formed integral with or formed separately from the input shaft 339 of the transmission T. The driven pulley 334 on the driven shaft 333 is axially slidable on the side of its axial end and is axially immovable on the side of the transmission T.

The engine E, the motor generator 308 and the battery B are connected to a controlling means (vehicle ECU) 311 and to this controlling means 311, information relating to traveling vehicle driving conditions such as a stepping-on amount of the brake pedal, a stepping-on amount of the accelerator pedal, etc. is also inputted.

In accordance with the vehicle driving condition of the traveling vehicle, the controlling means 311 detects start/stop, idling and rotational speed of the engine E, start/stop, idling and rotational speed of the motor generator 308 in its motor mode and start/stop, idling and rotational speed (regeneration operation, regeneration signal) of the motor generator 308 in its generator mode, charging condition (SOC) of the battery B, etc. and switches ON/OFF the electromagnetic clutch 312 for effecting switchover between an engine braking and a regenerative braking.

Next, with reference to FIG. 11, there will be described driving apparatus operational conditions provided by the controlling means 311 when mounted in the traveling vehicle driving apparatus 301.

When the traveling vehicle is motor-started and motor-driven, the vehicle is started from the stopped condition by the motor operation of the motor generator 308 alone (starting EV) and then driven (traveling EV). In this, the engine E remains stopped and the centrifugal clutch 304 is disengaged and torque transmission is effected in the forward direction from the motor generator 308 to the speed changer mechanism 305 (CVT).

In the case of engine driven traveling, from the vehicle stopped condition, the electromagnetic clutch 312 is switched ON, so that the engine E is started (cranking) by motor operation of the motor generator 308. The motor generator 308 functions as self starter motor, so that the engine E will be started without generation of cranking power. After the start of the engine E, the electromagnetic clutch 312 is switched OFF and the rotational speed of the engine E is increased. When the rotational speed of the engine E is increased to reach about 2000 rpm, the centrifugal clutch 304 begins to become engaged, and as the rotational speed increases, the slippage of the clutch decreases and there occurs a sudden torque rise until the speed becomes 3000 rpm approximately. At the rotational speed of 3000 rpm approximately, the centrifugal clutch 304 becomes engaged to transmit or feed the engine power to the stepless speed changer mechanism 305.

This condition wherein engine power is generated with simultaneous motor operation of the motor generator 308 is a hybrid operation condition (HEV). In this condition, there is generated a strong driving force combining the motor power and the engine power.

After the starting of the engine E or during traveling, if the motor operation of the motor generator 308 is stopped, the traveling (traveling E) will be effected only by the engine power. Conversely, if the motor generator 308 is switched over to the generator operation during high speed rotation of the engine E, the battery B can be charged with electric power generation.

When the traveling vehicle is decelerated by a stepping-on operation of the brake pedal or by releasing of a stepping-on operation of the accelerator pedal, the rotational speed of the engine E drops and the motor operation of the motor generator 308 is stopped and a generator operation condition is provided and by electric power generation operation (regeneration) of the motor generator 308, a rotation resistance is provided. In the course of this, the rotation of the engine E may be stopped (regeneration 2) or the engine E may be rendered into the idling condition (regeneration 1), and the torque transmission is effected in the reverse direction, i.e. from the speed changer mechanism 305 to the motor generator 308.

When the traveling vehicle is suddenly braked (large speed reduction) e.g. during traveling on a downslope, the motor generator 308 is rendered into the generator operation condition, and the rotation of the engine E is stopped to provide a regenerative braking condition (substantially same as the regeneration 2 at the time of speed reduction). Alternatively, the electromagnetic clutch 312 is switched ON to transmit the torque from the speed changer mechanism 305 to the propelling shaft 303 and the engine E is caused to provide its engine braking action (E braking). In this, with increase of the electric power regeneration by the motor generator 308, the braking force can be increased with utilizing of the engine braking action.

During traveling of the traveling vehicle, if the charge condition (SOC) of the battery B is high (full charging of B) by the generator operation of the motor generator 308, effective utilization of electric power regeneration is difficult. So, there will be provided an operation only by the motor operation (traveling EV) of the motor generator 308. Alternatively, there will be provided an operation by the hybrid operation condition (HEV) by the motor operation of the motor generator 308 and the driving of the engine E, thereby to save fuel consumption of the engine E.

Even if there occurs speed reduction or sudden braking of the traveling vehicle at the time of full charging of B of the battery B, the generator operation of the motor generator 308 will be kept stopped and the electric magnetic clutch 312 will be switched ON, to cause the engine E to provide an engine braking action (E braking).

The driving apparatus 301 effects transmission of the driving of the engine E with using the conventionally available centrifugal clutch and can effect the inertial energy collection of the traveling vehicle from the speed changer mechanism 305 and the engine braking action with utilization of the electromagnetic clutch 312. Further, the apparatus 301 can effect cranking of the engine E by the motor generator 308 with utilization of this electromagnetic clutch 312.

The electromagnetic clutch 312 is inoperative when large torque is constantly transmitted in the forward direction from the engine E to the speed changer mechanism 305, but is used on less frequent occasion when torque is transmitted in the reverse directly from the drive shaft 306 to the engine E. Therefore, a simple and inexpensive clutch which is only ON/OFF controlled can be used as this clutch.

Incidentally, the present invention is not limited to the foregoing embodiments. Various modifications of the components and arrangements are possible singly or in combination.

For instance, instead of the belt stepless speed changer mechanism 30, a planetary gear type stepless speed changer device or any other stepless speed changer mechanism can be employed.

The invention claimed is:

1. A hybrid vehicle comprising:
   an engine having an output shaft;
   a clutch having an input member and an output member;
   a stepless speed changer mechanism having a driving shaft and a driving member; and
   a motor generator having a rotor;
   wherein the output shaft is connected to the input member, the output member is connected to the driving shaft, and the rotor is connected and mounted on the driving shaft between the driving member and the output member;
   wherein the rotor defines a cooling air introduction hole opened in a longitudinal direction of the drive shaft for communicating a first space disposing the driving member and a second opening disposing the input member with each other;
   wherein the output member and the driving shaft are connected coaxially and together, the rotor is fixedly engaged to the driving shaft, and a stator of the motor generator is fixed to a clutch casing of the clutch and to a speed changer case of the stepless speed changer mechanism; and
   wherein the clutch casing defines an air inlet opening defined at a position on the clutch casing overlapped with the clutch in a direction extending along a length of each of the output member and the driving shaft, and the air introduced through the air inlet opening flowing through the cooling air introduction hole and reaching the speed changer case.

2. The hybrid vehicle according to claim 1, wherein the stepless speed changer mechanism comprises a belt stepless speed changer mechanism; and the clutch comprises a centrifugal clutch.

3. The hybrid vehicle according to claim 1, wherein the hybrid vehicle further comprises a controller, the controller causing the motor generator to motor-drive the rotor when the engine is stopped or is rotated at a low rotation speed or a high rotation speed.

4. The hybrid vehicle according to claim 1, wherein the hybrid vehicle further comprises a controller, the controller causing the motor generator to generator-drive the rotor by the power from the engine when the engine is rotated at a high rotation speed.

5. The hybrid vehicle according to claim 1, wherein the hybrid vehicle further comprises a controller, the controller causing the motor generator to generator-drive the rotor by the power from the stepless speed changer mechanism when there occurs a drop in the rotation speed of the engine.

6. The hybrid vehicle according to claim 1, wherein the clutch is a centrifugal clutch.

* * * * *